(12) United States Patent
Hahn et al.

(10) Patent No.: US 8,561,748 B1
(45) Date of Patent: Oct. 22, 2013

(54) SUSPENSION CONFIGURATION FOR A SEAT

(75) Inventors: Douglas C. Hahn, La Valle, WI (US); Jesse C. Boyarski, Richland Center, WI (US)

(73) Assignee: Seats, Inc., Reedsburg, WI (US)

( * ) Notice: Subject to any disclaimer, the term of this patent is extended or adjusted under 35 U.S.C. 154(b) by 0 days.

(21) Appl. No.: 13/445,739

(22) Filed: Apr. 12, 2012

(51) Int. Cl.
*F16M 13/00* (2006.01)
*B60N 2/54* (2006.01)

(52) U.S. Cl.
USPC ...... 180/326; 297/344.15; 248/421; 248/588; 248/590

(58) Field of Classification Search
USPC ......... 248/576, 421, 588, 560, 565, 567, 577, 248/587, 590, 591, 592, 566, 580, 581; 297/344.15; 267/131; 180/337, 326
See application file for complete search history.

(56) References Cited

U.S. PATENT DOCUMENTS

| | | | |
|---|---|---|---|
| 2,401,748 A | | 6/1946 | Dillon |
| 2,637,369 A | | 5/1953 | Demarest et al. |
| 2,701,693 A | | 2/1955 | Nordmark et al. |
| 3,059,966 A | | 10/1962 | Spielman |
| 3,086,742 A | | 4/1963 | Severson |
| 3,109,621 A | * | 11/1963 | Simons et al. ............. 248/564 |
| 3,338,632 A | | 8/1967 | Kleinsorge |
| 3,525,490 A | | 8/1970 | Duncan et al. |
| 3,560,049 A | | 2/1971 | Burton |
| 3,561,703 A | | 2/1971 | Stencel |
| 3,581,620 A | | 6/1971 | Hauck et al. |
| 3,599,232 A | | 8/1971 | Tabor |
| 3,628,634 A | | 12/1971 | Valukonis |
| 3,655,968 A | | 4/1972 | Moore et al. |
| 3,762,505 A | | 10/1973 | Morse |
| 3,779,591 A | | 12/1973 | Rands |
| 3,788,697 A | | 1/1974 | Barton et al. |
| 3,874,626 A | | 4/1975 | Gross et al. |

(Continued)

FOREIGN PATENT DOCUMENTS

EP 0078479 5/1983

OTHER PUBLICATIONS

Autoflug GmbH, Safety Seat System, Inndex Asia 2009, available online at: <http://www.defense-update.com/products/a/autoflug.htm>, Singapore Expo, May 12-14, 2009.

(Continued)

*Primary Examiner* — Drew Brown
(74) *Attorney, Agent, or Firm* — Michael Best & Friedrich LLP

(57) ABSTRACT

A seat suspension includes a lower support frame having a first slot, an upper support frame having a second slot, and a biasing member between the upper and lower support frames. A first suspension arm is connected to the lower support frame at a first end for rotation with respect to the lower support frame and connected to the upper support frame at a second end for rotation with respect to the upper support frame. A second suspension arm is connected to the first slot in the lower support frame for rotation with respect to the lower support frame and for translation with respect to the lower support frame along the first slot, and a second end coupled to the second slot in the upper support frame for rotation with respect to the upper support frame and for translation with respect to the upper support frame along the second slot.

18 Claims, 7 Drawing Sheets

(56) References Cited

U.S. PATENT DOCUMENTS

| | | | |
|---|---|---|---|
| 3,913,707 A | 10/1975 | Wastenson et al. | |
| 3,913,975 A | 10/1975 | Carter | |
| 3,985,388 A | 10/1976 | Hogan | |
| 4,029,283 A | 6/1977 | Swenson et al. | |
| 4,047,759 A | 9/1977 | Koscinski | |
| 4,072,287 A | 2/1978 | Swenson et al. | |
| 4,093,197 A * | 6/1978 | Carter et al. | 267/131 |
| 4,128,217 A | 12/1978 | Mazelsky | |
| 4,150,805 A | 4/1979 | Mazelsky | |
| 4,241,894 A | 12/1980 | Okuyama | |
| 4,295,627 A | 10/1981 | Graves | |
| 4,312,491 A * | 1/1982 | Aondetto | 248/575 |
| 4,358,154 A | 11/1982 | Campbell | |
| 4,359,200 A | 11/1982 | Brevard et al. | |
| 4,397,440 A | 8/1983 | Hall et al. | |
| 4,408,738 A | 10/1983 | Mazelsky | |
| 4,423,848 A | 1/1984 | Mazelsky | |
| 4,448,386 A | 5/1984 | Moorhouse et al. | |
| 4,461,444 A * | 7/1984 | Grassl et al. | 248/550 |
| 4,492,408 A | 1/1985 | Lohr | |
| 4,523,730 A | 6/1985 | Martin | |
| 4,525,010 A | 6/1985 | Trickey et al. | |
| 4,603,907 A | 8/1986 | Witzke | |
| 4,714,227 A | 12/1987 | Holm et al. | |
| 4,729,539 A | 3/1988 | Nagata | |
| 4,822,094 A | 4/1989 | Oldfather et al. | |
| 4,852,849 A | 8/1989 | Jones | |
| 4,856,763 A | 8/1989 | Brodersen et al. | |
| 4,997,233 A | 3/1991 | Sharon | |
| 5,125,598 A | 6/1992 | Fox | |
| 5,222,709 A * | 6/1993 | Culley et al. | 248/421 |
| 5,222,915 A | 6/1993 | Petrzelka et al. | |
| 5,253,924 A | 10/1993 | Glance | |
| 5,273,240 A | 12/1993 | Sharon | |
| 5,338,091 A | 8/1994 | Miller | |
| 5,364,060 A | 11/1994 | Donovan et al. | |
| 5,439,271 A | 8/1995 | Ryan | |
| 5,487,562 A | 1/1996 | Hedderly et al. | |
| 5,542,638 A | 8/1996 | Smith | |
| 5,558,301 A | 9/1996 | Kerdoncuff et al. | |
| 5,601,338 A | 2/1997 | Wahls | |
| 5,651,585 A | 7/1997 | Van Duser | |
| 5,676,336 A | 10/1997 | Nefy et al. | |
| 5,692,705 A | 12/1997 | Bellais | |
| 5,743,591 A | 4/1998 | Tame | |
| 5,758,859 A | 6/1998 | Gonzalez | |
| 5,794,911 A | 8/1998 | Hill | |
| 5,842,669 A | 12/1998 | Ruff | |
| 5,927,679 A | 7/1999 | Hill | |
| 5,984,410 A | 11/1999 | Brodersen | |
| 6,152,534 A | 11/2000 | Maeda et al. | |
| 6,186,467 B1 | 2/2001 | Wahls | |
| 6,237,889 B1 | 5/2001 | Bischoff | |
| 6,299,252 B1 | 10/2001 | Frohnhaus et al. | |
| 6,347,778 B1 | 2/2002 | Koga et al. | |
| 6,357,729 B1 | 3/2002 | Takata | |
| 6,361,117 B1 | 3/2002 | Tate | |
| 6,378,939 B1 | 4/2002 | Knoll et al. | |
| 6,394,393 B1 | 5/2002 | Mort | |
| 6,409,243 B1 | 6/2002 | Hansen | |
| 6,550,740 B1 * | 4/2003 | Burer | 248/564 |
| 6,585,190 B2 | 7/2003 | Mort | |
| 6,644,737 B2 | 11/2003 | Kohl et al. | |
| 6,773,049 B2 | 8/2004 | Rupiper et al. | |
| 6,776,384 B2 | 8/2004 | Igarashi | |
| 6,820,931 B2 | 11/2004 | Ruff et al. | |
| 6,913,314 B2 | 7/2005 | Hansen | |
| 6,935,693 B2 | 8/2005 | Janscha et al. | |
| 7,032,874 B2 | 4/2006 | Meyers et al. | |
| 7,063,382 B2 | 6/2006 | Ali et al. | |
| 7,070,236 B2 | 7/2006 | Kawashima | |
| 7,134,713 B1 | 11/2006 | Tseng | |
| 7,134,721 B2 | 11/2006 | Robinson | |
| 7,147,287 B2 | 12/2006 | Kuivala | |
| 7,168,671 B2 | 1/2007 | Bostrom et al. | |
| 7,185,867 B2 | 3/2007 | Hill et al. | |
| 7,246,836 B2 | 7/2007 | Hahn | |
| 7,314,249 B2 | 1/2008 | Becker et al. | |
| 7,393,030 B2 | 7/2008 | Steeg et al. | |
| 7,445,181 B2 | 11/2008 | Knoll et al. | |
| 7,484,781 B1 | 2/2009 | Garber et al. | |
| 7,744,155 B2 | 6/2010 | List et al. | |
| 7,819,469 B2 | 10/2010 | Stevens | |
| 8,016,258 B1 | 9/2011 | Boyarski et al. | |
| 2010/0102602 A1 | 4/2010 | Hansen | |
| 2010/0117408 A1 | 5/2010 | Hansen | |
| 2010/0207433 A1 | 8/2010 | Hahn | |

OTHER PUBLICATIONS

Industrial Seats, Division of United Group, Air Suspension Kit for Freightliner, M2 Medium Duty Trucks, 2002 & Up, available online at: <http://www.industrialseats.com/product.asp?pgrID=86 &categoryID=23&pID=239>, published prior to Jul. 6, 2004.

National Seating, published prior to Jul. 6, 2004.

Federal Motor Vehicle Safety Standards (FMVSS), 49 CFR Ch. V (Oct. 1, 2005 Edition), Sections 571.207 and 571.210, USA. Standards predate Jul. 6, 2004.

The Society of Automotive Engineers, Inc. (SAE), Surface Vehicle Recommended Practice, Issued Apr. 1999, pp. 1-11, J2287, Society of Automotive Engineers, Inc., Copyright 1999, USA.

The C.E. White Co., New! Drivers Safety Seat, Model ISH-2002, The C.E. White Co., 2003, New Washington, Ohio, USA.

Kubota Corporation, photographs of an adjustable seat suspension assembly, publicly disclosed prior to Nov. 21, 2002.

Milsco Manufacturing Company, promotional material of an adjustable seat suspension assembly, published prior to Nov. 21, 2002.

Seats Incorporated, drawings of an adjustable seat suspension assembly, publicly disclosed prior to Nov. 21, 2002.

* cited by examiner

SUSPENSION CONFIGURATION FOR A SEAT

BACKGROUND

The present invention relates to off-road vehicles and suspension systems for a seat assembly in off-road vehicles.

SUMMARY

In one embodiment, the invention provides a suspension configuration for a seat that includes a lower support frame mounted to a vehicle body. The lower support frame includes a first slot. An upper support frame is spaced a distance vertically above the lower support frame, includes a second slot and supports a seat. At least one biasing member is connected to the lower support frame and is connected to the upper support frame. The at least one biasing member biases the upper support frame away from the lower support frame. A first suspension arm has a first end that is connected to the lower support frame for rotation with respect to the lower support frame and a second end that is connected to the upper support frame for rotation with respect to the upper support frame. A second suspension arm has a first end that is connected to the first slot in the lower support frame for rotation with respect to the lower support frame and for translation with respect to the lower support frame along the first slot and a second end that is connected to the second slot in the upper support frame for rotation with respect to the upper support frame and for translation with respect to the upper support frame along the second slot. The first suspension arm is connected to the second suspension arm at a location between the first and second ends of the second suspension arm and between the first and second ends of the first suspension arm. The first suspension arm is rotatable with respect to the second suspension arm about the location.

In another embodiment the invention provides a vehicle including a chassis, a wheel supporting the chassis, a prime mover mounted to the chassis, and a transmission for driving the wheel in response to the operation of the prime mover. A lower support frame is mounted to the vehicle and includes a first slot. An upper support frame is spaced a distance vertically above the lower support frame and includes a second slot. A seat cushion is positioned on the upper support frame. At least one biasing member is connected to the lower support frame and connected to the upper support frame. The at least one biasing member biases the upper support frame away from the lower support frame. A first suspension arm has a first end connected to the lower support frame for rotation with respect to the lower support frame and a second end connected to the upper support frame for rotation with respect to the upper support frame. A second suspension arm has a first end connected to the first slot in the lower support frame for rotation with respect to the lower support frame and for translation with respect to the lower support frame along the first slot and a second end connected to the second slot in the upper support frame for rotation with respect to the upper support frame and for translation with respect to the upper support frame along the second slot. The first suspension arm is connected to the second suspension arm at a location between the first and second ends of the second suspension arm and between the first and second ends of the first suspension arm. The first suspension arm rotates with respect to the second suspension arm about the coupling location.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
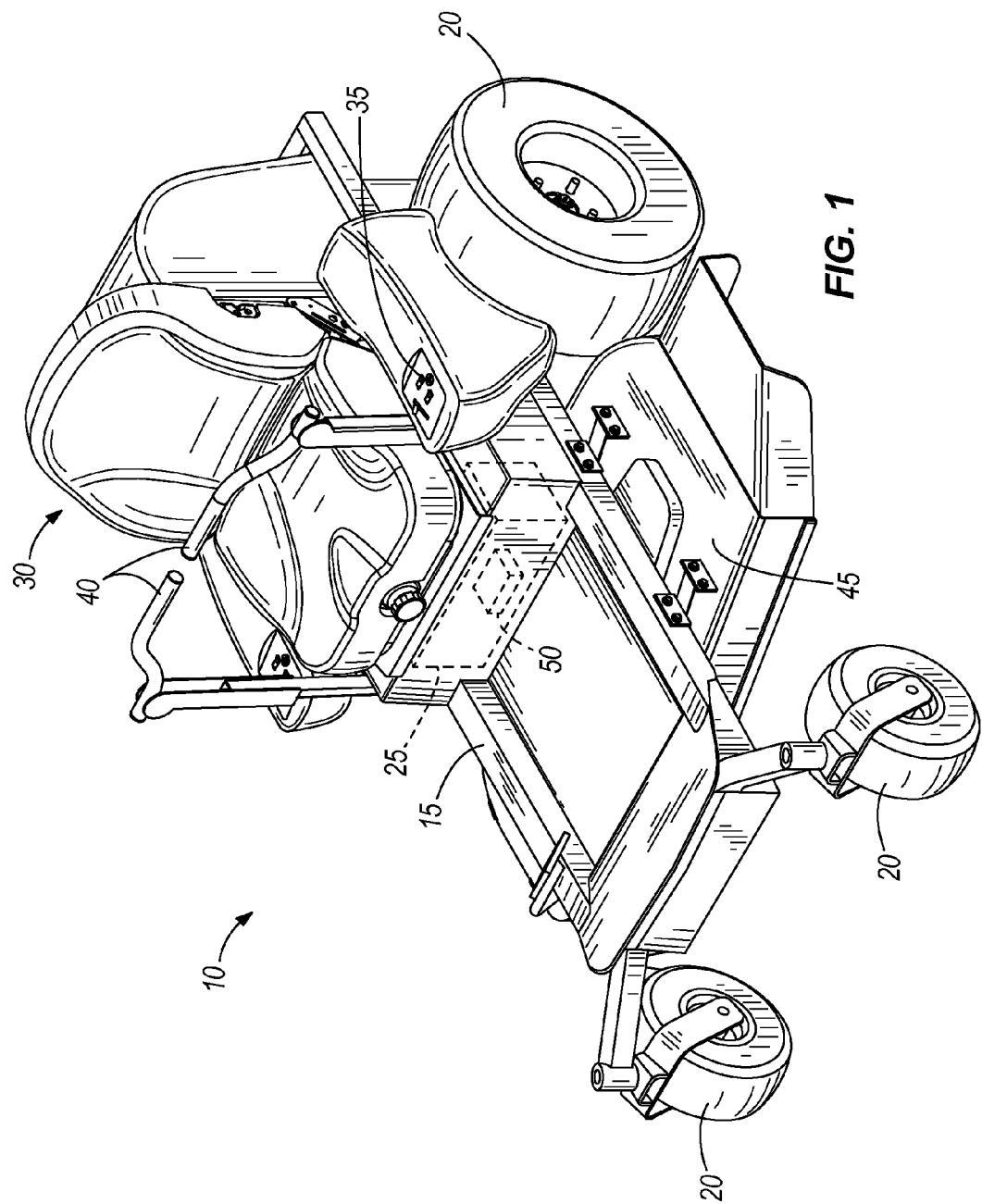
FIG. 1 is a perspective view of an off-highway vehicle including a seat assembly according to the present invention.

FIG. 1 illustrates an off-highway vehicle 10 that includes a chassis 15, wheels 20 supporting the chassis 15, an internal combustion engine 25 mounted to the chassis 15, a seat 30 mounted to the chassis 15, a control panel 35, control levers 40, and a mower deck 45. An operator zone of the vehicle 10 includes the seat 30 and controls and components within reach of an operator seated in the seat 30 (e.g., the control panel 35 and the control levers 40). One suitable off-highway vehicle is commonly referred to as a zero-turn radius lawn mower, but the invention may be embodied in other types of off-highway vehicles and other vehicles intended for road use; the invention is not limited to the application illustrated.

In the illustrated embodiment, the engine 25 includes an ignition system 50 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. In this regard, the ignition system 50 may be termed an ignition circuit that permits operation of the engine 25 when closed and disables operation of the engine 25 when open. Although the illustrated embodiment includes an internal combustion engine 25, the present invention may be applied to vehicles and systems having alternative prime movers, such as batteries or other energy storage devices, fuel cells, or gas/electric hybrid drive systems. In such other embodiments, the ignition system would include the electric circuit that enables and disables the prime mover to operate or that enables and disables the vehicle drive and implement systems to operate under the influence of the prime mover.

In the illustrated embodiment, the engine 25 drives rotation of at least one of the wheels 20 through a transmission (e.g., a hydraulic, electric, or mechanical transmission). The operator independently controls speed and direction of rotation of the left and right side wheels 20 via the control levers 40. In some embodiments, the engine 25 also selectively drives rotation of one or more cutting blades under the mower deck 45 to cut vegetation over which the vehicle 10 travels.

Figure 2:
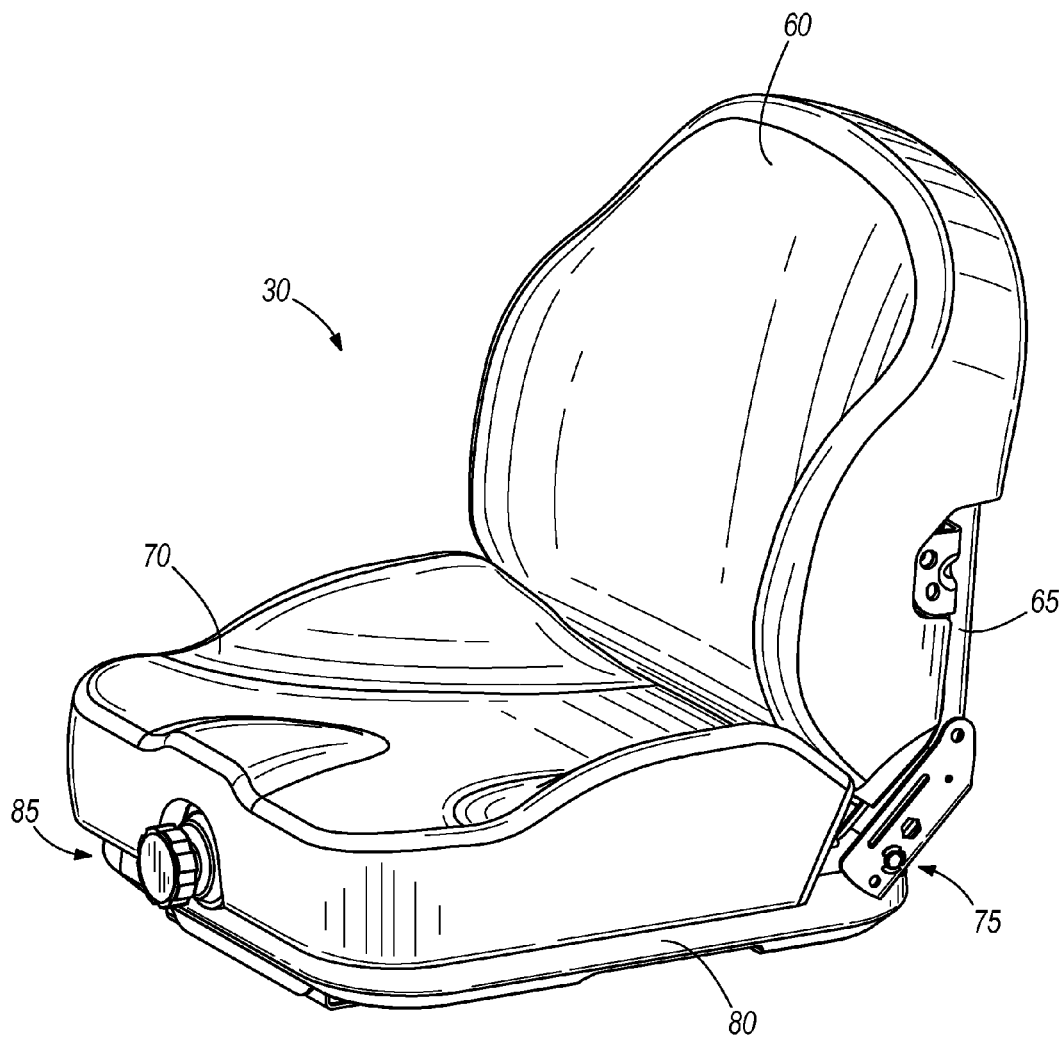
FIG. 2 is a perspective view of the seat assembly.

With reference to FIG. 2, the seat 30 includes a back cushion 60, a back frame 65, a bottom cushion 70, a bottom frame assembly 75, a flexible bellows 80, and an adjustment assembly 85. The seat 30 accommodates an operator of the vehicle 10. The back frame 65 supports the back cushion 60, and the bottom frame assembly 75 supports the bottom cushion 70. The flexible bellows 80 substantially encloses the bottom frame assembly 75 and adjustment assembly 85, while accommodating movement of the bottom frame assembly 75.

Figure 3:
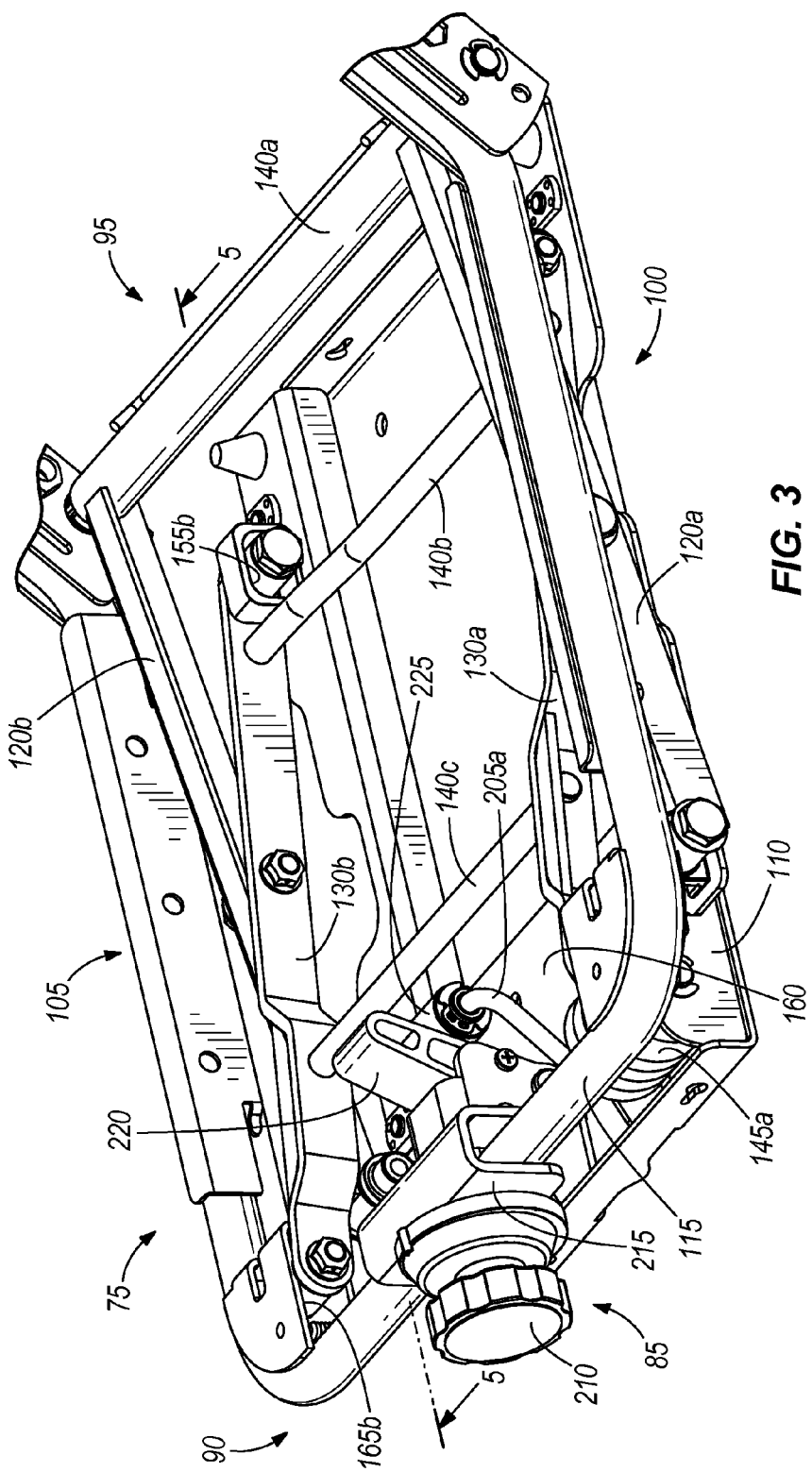
FIG. 3 is a perspective view of a bottom frame of the seat assembly.
Figure 4:
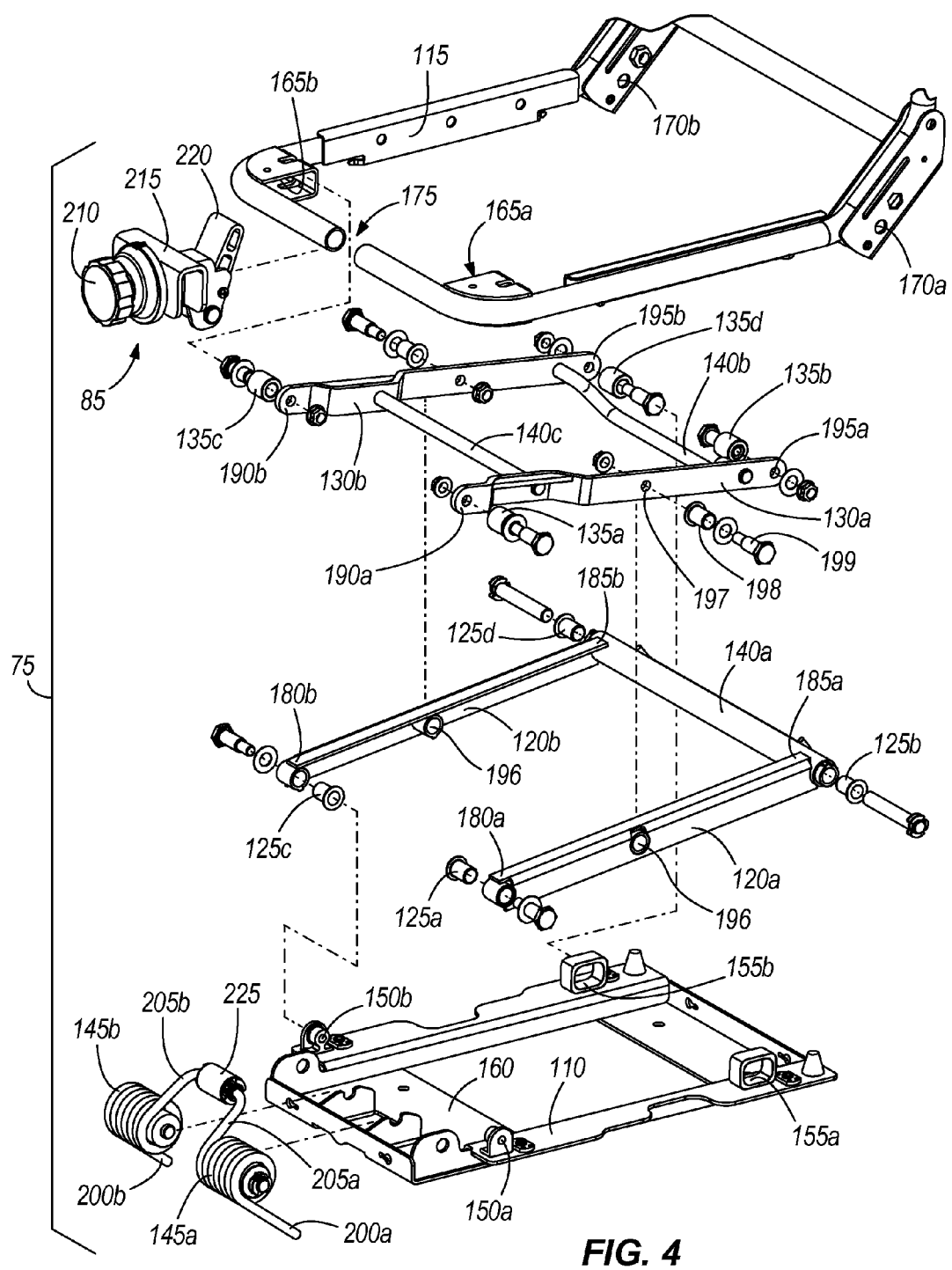
FIG. 4 is an exploded perspective view of the bottom frame of the seat assembly.

With reference to FIGS. 3 and 4, the bottom frame assembly 75 includes a front portion 90, a rear portion 95, a left side portion 100, a right side portion 105, a lower support frame 110, an upper support frame 115, a first suspension arm 120a, a second suspension arm 120b, a first bearing 125a, a second bearing 125b, a third bearing 125c, a fourth bearing 125d, a third suspension arm 130a, a fourth suspension arm 130b, a first roller 135a, a second roller 135b, a third roller 135c, a fourth roller 135d, a first crossbar 140a, a second crossbar 140b, a third crossbar 140c, a first torsion spring 145a, and a second torsion spring 145b. The terms "front," "rear," "left," and "right" are from the perspective of an operator seated in the seat 30 during normal use of the vehicle 10. A "front portion" of the seat 30 is the portion closer to the front portion 90 of the bottom frame assembly 75 than to the rear portion 95, and a "rear portion" of the seat 30 is the portion closer to the rear portion 95 of the bottom frame assembly 75 than to the front portion 90.

The left side portion 100 and right side portion 105 extend between the front portion 90 and the rear portion 95. The lower support frame 110 is coupled to the chassis 15 and the upper support frame 115 supports the bottom cushion 70.

With continued reference to FIGS. 3 and 4, the lower support frame 110 includes first aperture 150a, a second aperture 150b, a first slot 155a, a second slot 155b, and a bearing surface 160. The first and second apertures 150a, 150b are positioned in the front portion 90 and the first and second slots 155a, 155b are positioned in the rear portion 95. The first and second apertures 150a, 150b are substantially circular whereas the first and second slots 155a, 155b are substantially elongate in the direction extending between the front portion 90 and the rear portion 95. The first aperture 150a and the first slot 155a are positioned on the left side portion 100 and the second aperture 150b and the second slot 155b are positioned on the right side portion 105. The lower support frame 110 is substantially symmetrical. Therefore, the first aperture 150a is substantially a mirror-image of the second aperture 150b and similarly, the first slot 155a is substantially a mirror-image of the second slot 155b. The bearing surface 160 is positioned in the front portion 90 of the bottom frame assembly 75.

The upper support frame 115 includes a first slot 165a, a second slot 165b, a first aperture 170a, a second aperture 170b, and an opening 175. The first and second slots 165a, 165b are positioned in the front portion 90 and the first and second apertures 170a, 170b are positioned in the rear portion 95. The first and second slots 165a, 165b are substantially elongate in the direction extending between the front portion 90 and the rear portion 95, whereas the first and second apertures 170a, 170b are substantially circular. The first slot 165a and the first aperture 170a are positioned on the left side 100 portion and the second slot 165b and the second aperture 170b are positioned on the right side portion 105. The upper support frame 115 is substantially symmetrical. Therefore, the first slot 165a is substantially a mirror-image of the second slot 165b and similarly, the first aperture 170a is substantially a mirror-image of the second aperture 170b. The opening 175 is positioned in the front portion 90 of the bottom frame assembly 75.

The first suspension arm 120a is substantially a mirror-image of the second suspension arm 120b. The first suspension arm 120a includes a front end 180a and a rear end 185a, and the second suspension arm 120b includes a front end 180b and a rear end 185b. The front ends 180a, 180b are positioned in the front portion 90 of the seat 30. The rear ends 185a, 185b are positioned in the rear portion 95 of the seat 30. The first suspension arm 120a is positioned on the left side portion 100 of the seat 30, and the second suspension arm 120b is positioned on the right side portion 105 of the seat 30.

The first bearing 125a is received within a hole in the front end 180a of the first suspension arm 120a, and a shoulder bolt or other suitable fastener extends through the first bearing 125a and threads into the first aperture 150a of the lower support frame 110. The second bearing 125b is received in an end of the first crossbar 140a (which is tubular). The crossbar 140a is rigidly interconnected to the rear end 185a of the first suspension arm 120a. A pin extends through the first aperture 170a of the upper support frame 115. In similar fashion, the front and rear ends 180b, 185b of the second suspension arm 120b are mounted to the third and fourth bearings 125c, 125d and the lower and upper support frames 110, 115. The result is that the front and rear ends of the first and second suspension arms 120a, 120b are interconnected to the lower and upper support frames 110, 115 at fixed pivots, which is to say that the pivot point for each end does not move with respect to the frame to which it is mounted.

The third suspension arm 130a is substantially a mirror-image of the fourth suspension arm 130b. The third suspension arm 130a includes a front end 190a and a rear end 195a, and the fourth suspension arm 130b includes a front end 190b and a rear end 195b. The front ends 190a, 190b are positioned in the front portion 90 of the seat 30. The rear ends 195a, 195b are positioned in the rear portion 95 of the seat 30. The third suspension arm 130a is positioned on the left side portion 100 of the seat 30, and the fourth suspension arm 130b is positioned on the right side portion 105 of the seat 30.

The front ends 190a, 190b of the third and fourth suspension arms 130a, 130b are coupled to the first and second slots 165a, 165b in the upper support frame 115 by way of the first and third rollers 135a, 135c. More specifically, a shoulder bolt or other fastener couples the first and third rollers 135a, 135c to the front ends 190a, 190b of the respective third and fourth suspension arms 130a, 130b, and the first and third rollers 135a, 135c are received within the first and second slots 165a, 165b.

The first and third rollers 135a, 135c are pivotable on the shoulder bolts and can roll linearly within the first and second slots 165a, 165b. Consequently, the interconnections between the third and fourth suspension arms 130a, 130b and the lower and upper frame assemblies 110, 115 are may be termed movable pivots, which is to say that the pivot point for each end of each suspension arm 130a, 130b can translate and pivot with respect to the frame to which it is mounted. In alternative embodiments, one of more of the first, second, third and fourth rollers 135a, 135b, 135c, 135d can be replaced with sliders that slide along the respective slots 155a, 155b, 165a, 165b.

The first crossbar 140a is positioned in the rear portion 95 of the seat and is coupled to the rear ends 185a, 185b of the first and second suspension arms 120a, 120b. The first crossbar 140a stabilizes the first and second suspension arms 120a, 120b. In other embodiments, the first crossbar 140a may be integral with the upper support frame 115 and the first and second suspension arms 120a, 120b may rotate with respect to the first crossbar 140a.

The second and third crossbars 140b, 140c extend between and are coupled to the third and fourth suspension arms 130a, 130b. The second and third crossbars 140b, 140c are positioned between the front ends 190a, 190b and the rear ends 195a, 195b of the third and fourth suspension arms 130a, 130b. The second and third crossbars 140b, 140c can provide stability for the third and fourth suspension arms 130a, 130b. In other embodiments, more or fewer crossbar(s) can be utilized.

The first suspension arm 120a is pivotally coupled to the third suspension arm 130a and the second suspension arm 120b is pivotally coupled to the fourth suspension arm 130b to form a scissor suspension arrangement. More specifically, the first and second suspension arms 120a, 120b each include a bushing sleeve 196 and the third and fourth suspension arms 130a, 130b each include a hole 197 in a middle portion. A bushing 198 is received in each of the bushing sleeves 196, and a fastener (e.g., the illustrated shoulder bolt 199 and nut, a pin, or any other suitable fastener) extend through the bushing 198 and the hole 197. As the scissor suspension arrangement is actuated, the pivot point defined by the fasteners move generally up and down. In this regard, the suspension arms 120a, 120b, 130a, 130b can be said to be coupled at a moving pivot point.

The first and second torsion springs 145a, 145b each include a first end 200a, 200b having a first length, a second end 205a, 205b having a second length and a coil defining a coil axis and extending between the first and second ends 200a, 200b, 205a, 205b. The first and second torsion springs 145a, 145b are coupled to the lower support frame 110 and the first ends 200a, 200b bear against the bearing surface 160 on the lower support frame 110.

With continued reference to FIGS. 3 and 4, the adjustment assembly 85 includes a handle 210, a housing 215, a lever 220, and a roller 225. The adjustment assembly 85 is coupled to the upper support frame 115 adjacent the opening 175. The handle 210 is a user actuable control and is positioned proximate the front portion 90 of the seat 30, to permit a user to grasp the handle 210 while sitting in the seat 30. In this regard, the adjustment handle 210 can be said to be in the operator zone. The handle 210 is coupled to the housing 215 for rotation with respect to the housing 215. The housing 215 extends across the opening 175 in the upper support frame 115 and is fixed with respect to the upper support frame 115. The lever 220 is pivotably coupled to the housing 215, and pivots in response to rotation of the handle 210. While the rotatable handle 210 is illustrated, other suitable user actuable controls can be utilized to pivot the lever 220 with respect to the housing 215.

The roller 225 is coupled to the second ends 205a, 205b of the torsion springs 145a, 145b. The torsion springs 145a, 145b bias the roller 225 against the lever 220. The biasing force of the torsion springs 145a, 145b against the roller includes an element of force that pushes the adjustment assembly 85 upward. Because the adjustment assembly 85 is fixed to the upper support frame 115, the biasing force of the torsion springs 145a, 145b also biases the upper support frame 115 upward, away from the lower support frame 110.

Rotation of the handle 210 in a first direction pivots the lever 220 against the roller 225, which in turn deflects the ends of the torsion springs 145a, 145b to increase the load on the springs 145a, 145b, which stiffens the suspension. Rotation of the handle 210 in a second direction (opposite the first direction) pivots the lever 220 in an opposite direction, which relieves the load on the springs 145a, 145b and softens the suspension. Because of the arrangement of the lever 220 and roller 225, the surface of the lever 220 against which the roller 225 bears becomes more and more horizontal as the handle 210 is rotated in the first direction and more and more vertical as the handle 210 is rotated in the second direction. This exacerbates the stiffening and softening of the suspension, because the line of force of the springs 145a, 145b is a normal force against the lever 220. As the springs 145a, 145b are loaded (i.e., as a result of the handle 210 rotating in the first direction), the line of force of the springs 145a, 145b becomes more and more vertical, resulting in a larger component acting vertically. On the other hand, as the handle 210 is rotated in the second direction, the springs 145a, 145b are unloaded even as the component of force in the vertical direction decreases.

The upper support frame 115 is vertically moveable with respect to the lower support frame 110 in response to the first and second suspension arms 120a, 120b pivoting with respect to the lower and upper support frames 110, 115 and in response to the third and fourth suspension arms 130a, 130b pivoting and translating with respect to the lower and upper support frames 110, 115. Specifically, the front end 180a of the first suspension arm 120a is rotatable about the first aperture 150a with respect to the lower support frame 110, and the front end 180b of the second suspension arm 120b is rotatable about the second aperture 150b with respect to the lower support frame 110. The rear end 185a of the first suspension arm 120a is rotatable about the first aperture 170a with respect to the upper support frame 115, and the rear end 185b of the second suspension arm 120b is rotatable about the second aperture 170b with respect to the upper support frame 115. Additionally, the front end 190a of the third suspension arm 130a is rotatable and translatable along the first slot 165a with respect to the upper support frame 115, and the front end 190b of the fourth suspension arm 130b is rotatable and translatable along the second slot 165b with respect to the upper support frame 115. The rear end 195a of the third suspension arm 130a is rotatable and translatable along the first slot 155a with respect to the lower support frame 110, and the rear end 195b of the fourth suspension arm 130b is rotatable and translatable along the second slot 155b with respect to the lower support frame 110.

Figure 5:
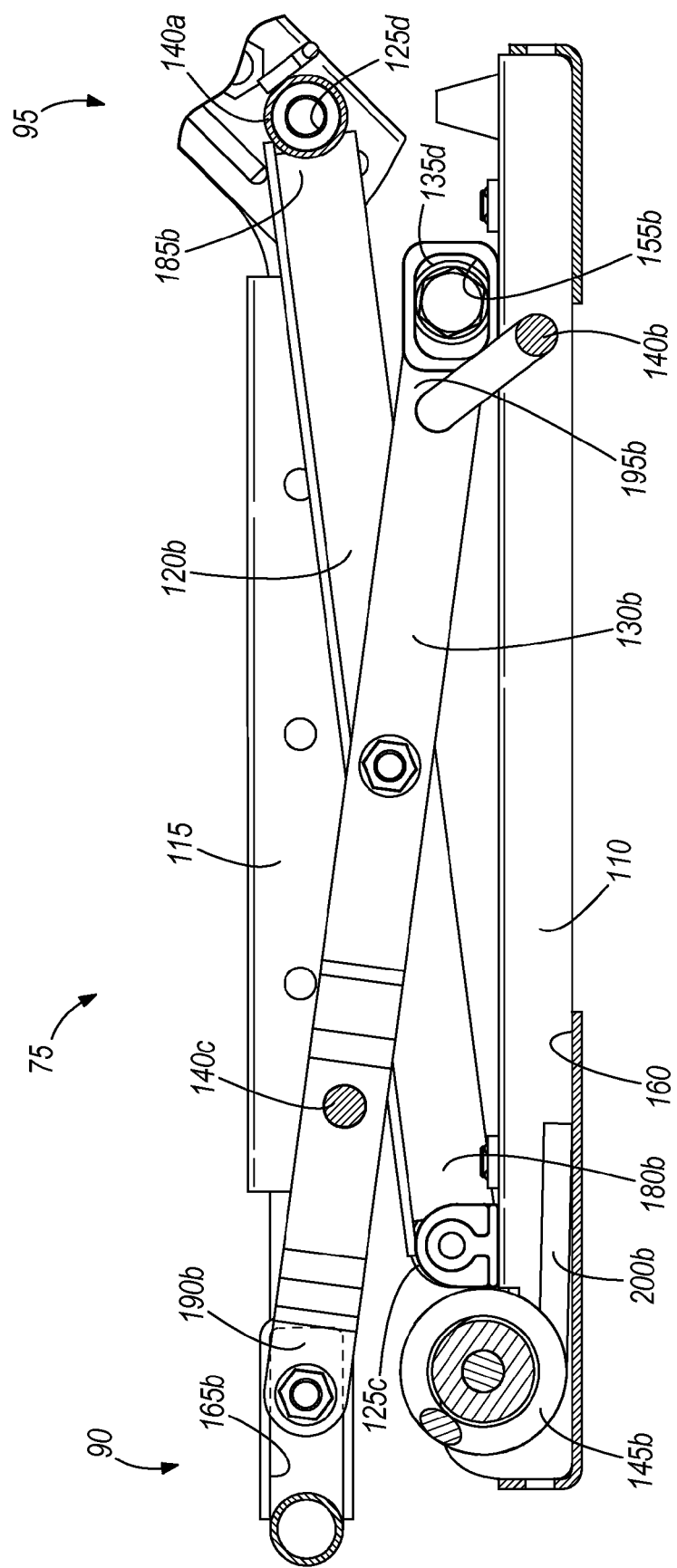
FIG. 5 is a cross-section view taken along line 5-5 of FIG. 3 showing the bottom frame in a first position.

With reference to FIG. 5, the bottom frame assembly 75 is in an intermediate position within a range of positions. In the intermediate position illustrated in FIG. 5, the front end 190b of the fourth suspension arm 130b is in a first location in the second slot 165b and the rear end 195b of the fourth suspension arm 130b is in a first location in the second slot 155b. In the intermediate position illustrated in FIG. 5, the upper support frame 115 is substantially parallel to the lower support frame 110 and is spaced a first distance therefrom.

As the upper support frame 115 moves up and down with respect to the lower support frame 110, the first and second suspension arms 120a, 120b pivot with respect to the lower and upper support frames 110, 115, and the third and fourth suspension arms 130a, 130b pivot about and translate along the lower and upper support frames 110, 115. The third suspension arm 130a rotates with respect to the first suspension arm 120*a* and the fourth suspension arm 130*b* rotates with respect to the second suspension arm 120*b*.

Figure 6:
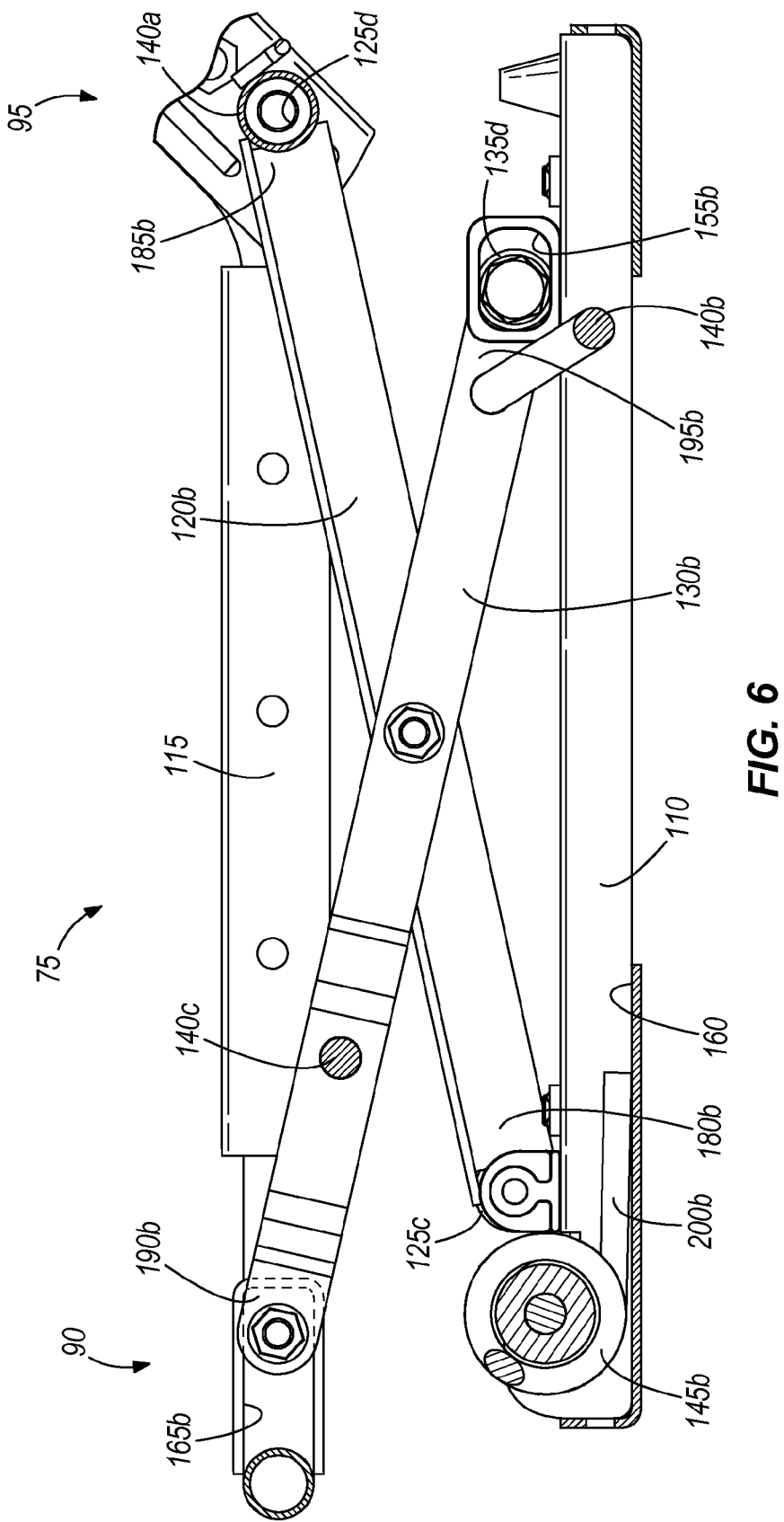
FIG. 6 is similar to FIG. 5 but showing the bottom frame in a second position.

With reference to FIG. 6, the bottom frame assembly 75 is in a topped-out position. In the topped-out position illustrated in FIG. 6, the front end 190*b* of the fourth suspension arm 130*b* is in a second location in the second slot 165*b* and the rear end 195*b* of the fourth suspension arm 130*b* is in a second location in the second slot 155*b*. The second location in the second slot 165*b* is further from the front portion 90 than the first location in the second slot 165*b*. The second location in the second slot 155*b* is further from the rear portion 95 than the first location in the second slot 155*b*. In the illustrated embodiment, the fourth roller 135*d* is at a first end of the second slot 155*b* and the third roller 135*c* (at the front end 190*a* of the fourth suspension arm 130*b*) is near a first end of the slot 165*b*. In another embodiment, the rollers 135*c*, 135*d* are positioned in other locations along the respective slots 155*b*, 165*b*. In the topped-out position illustrated in FIG. 6, the upper support frame 115 is substantially parallel to the lower support frame 110 and is spaced a second distance therefrom.

Figure 7:
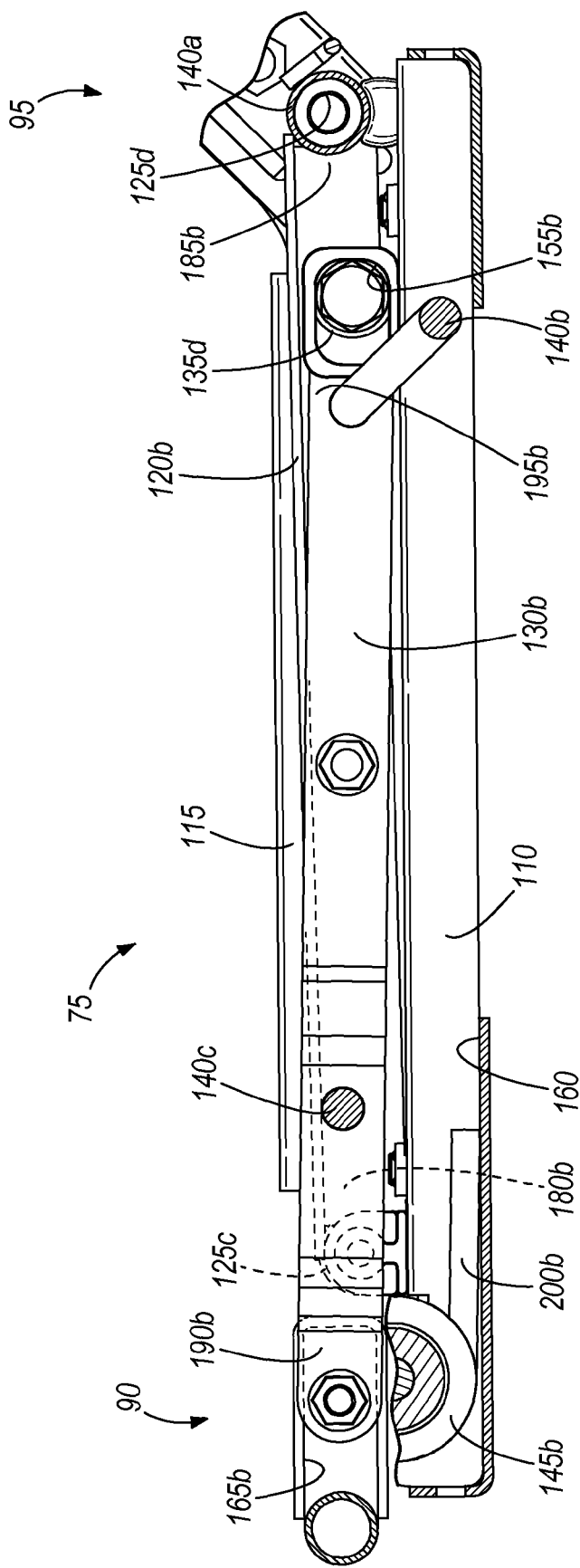
FIG. 7 is similar to FIG. 5 but showing the bottom frame in a third position.

With reference to FIG. 7, the bottom frame assembly 75 is in a bottomed-out position. In the bottomed-out position illustrated in FIG. 7, the front end 190*b* of the fourth suspension arm 130*b* is in a third location in the second slot 165*b* and the rear end 195*b* of the fourth suspension arm 130*b* is in a third location in the second slot 155*b*. The third location in the second slot 165*b* is closer to the front portion 90 than the first and second locations in the second slot 165*b*. The third location in the second slot 155*b* is closer to the rear portion 95 than the first and second locations in the second slot 155*b*. In the illustrated embodiment, the fourth roller 135*d* is at a second end of the second slot 155*b* and the third roller 135*c* (at the front end 190*a* of the fourth suspension arm 130*b*) is between the first end and a second end of the slot 165*b*. In another embodiment, the rollers 135*c*, 135*d* are positioned in other locations along the respective slots 155*b*, 165*b*. In the bottomed-out position illustrated in FIG. 7, the upper support frame 115 is substantially parallel to the lower support frame 110 and is spaced a third distance therefrom. In the illustrated embodiment, the suspension arms 120*b* and 130*b* are almost parallel in the bottomed-out position.

The difference between the second distance and the third distance defines the stroke of the seat 30. In some embodiments, upper support frame 115 is moveable between about two and about four inches with respect to the lower support frame 110 (e.g., the seat has a stroke of between 2 inches and 4 inches). In some embodiments, the upper support frame 115 is moveable about three inches with respect to the lower support frame 110 (e.g., the seat has a stroke of 3 inches). The illustrated seat 30 is a low-profile suspension seat that has a seating index point of about eight inches measured per SAE J1163 SPEC.

In some embodiments, the seat 30 can be positioned in a vehicle (such as a truck) in which the upper support frame 115 is moveable between about four inches and about eight inches with respect to the lower support frame 110 (e.g., the seat has a stroke of between 4 inches and 8 inches). In some embodiments, the upper support frame 115 is moveable about six inches with respect to the lower support frame 110 (e.g., the seat has a stroke of about 6 inches).

In operation, as the vehicle 10 travels over uneven ground, the upper support frame 115 is permitted to move with respect to the lower support frame 110 because the first and second suspension arms 120*a*, 120*b* are permitted to rotate with respect to the upper and lower support frames 115, 110, and the third and fourth suspension arms 130*a*, 130*b* are permitted to rotate and translation with respect to the upper and lower support frames 115, 110. The torsion springs 145*a* and 145*b* bias the upper support frame 115 away from the lower support frame 110 and the weight of the user biases the upper support frame 115 towards the lower support frame 110.

The stiffness of the suspension is adjustable by actuation of the adjustment assembly 85 to thereby alter the biasing force of the torsion springs 145*a*, 145*b* which biases the upper support frame 115 away from the lower support frame 110. Movement of the suspension is also affected by the actual weight of a given user sitting on the seat 30. Regardless of the suspension setting, the resistance to downward movement increases as the seat 30 moves downward. Specifically, as the seat 30 moves downward, the torsion springs 145*a*, 145*b* load up (increase in force), resulting in greater resistance to further downward movement of the seat 30 to inhibit the seat 30 from bottoming out.

The slots 155*a*, 155*b*, 165*a*, 165*b* have greater tolerance to accommodate suspension arms 120*a*, 120*b*, 130*a*, 130*b* having various dimensions. The seat 30 can freely move up and down without straining the suspension arms 120*a*, 120*b*, 130*a*, 130*b* or the frames 110, 115 because of inadequate or unsatisfactory component tolerances. The first and second suspension arms 120*a*, 120*b* are pivotally coupled to the lower support frame 110 and the upper support frame 115. The third suspension arm 130*a* is pivotally coupled to the first suspension arm 120*a*, and the fourth suspension arm 130*b* is pivotally coupled to the second suspension arm 120*b*. The third and fourth suspension arms 130*a*, 130*b* are pivotally and translationally coupled to the lower support frame 110 and the upper support frame 115. Because the third and fourth suspension arms 130*a*, 130*b* are free to pivot and translate with respect to the lower support frame 110 and the upper support frame 115, the suspension configuration compensates for a wider variation of interconnection tolerances.

Various features and advantages of the invention are set forth in the following claims.

What is claimed is:

1. A suspension configuration for a seat, the suspension configuration comprising:

a lower support frame mountable to a vehicle body, the lower support frame including a first slot;

an upper support frame spaced a distance vertically above the lower support frame, the upper support frame including a second slot, the upper support frame adapted to support a seat;

at least one biasing member coupled to the lower support frame and coupled to the upper support frame, the at least one biasing member biasing the upper support frame away from the lower support frame;

a first suspension arm having a first end coupled to the lower support frame for rotation with respect to the lower support frame and a second end coupled to the upper support frame for rotation with respect to the upper support frame; and a second suspension arm having a first end coupled to the first slot in the lower support frame for rotation with respect to the lower support frame and for translation with respect to the lower support frame along the first slot, and a second end coupled to the second slot in the upper support frame for rotation with respect to the upper support frame and for translation with respect to the upper support frame along the second slot, wherein the first suspension arm is coupled to the second suspension arm at a coupling location between the first and second ends of the second suspension arm and between the first and second ends of the first suspension arm, the first suspension arm being rotatable with respect to the second suspension arm about the coupling location.

2. The suspension configuration of claim 1, wherein the first slot permits substantially horizontal movement of the first end of the second suspension arm and wherein the second slot permits substantially horizontal movement of the second end of the second suspension arm.

3. The suspension configuration of claim 1, wherein the upper support frame moves a distance of between about two inches and about eight inches with respect to the lower support frame between a fully raised position in which at least one of the first and second ends of the second suspension arm is at an end of one of the respective first and second slots and a fully lowered position in which at least one of the first and second ends is at another end of the respective first and second slots.

4. The suspension configuration of claim 3, wherein the upper support frame moves a distance of between about three inches and about six inches with respect to the lower support frame in response to the first suspension arm rotating with respect to the second suspension arm about the coupling location.

5. The suspension configuration of claim 1, wherein the upper support frame moves substantially vertically with respect to the lower support frame in response to the first suspension arm rotating with respect to the second suspension arm about the coupling location.

6. The suspension configuration of claim 1, further comprising a user actuable control coupled to the seat and operable to alter the stiffness of the at least one biasing member which thereby alters the stiffness of the suspension.

7. The suspension configuration of claim 1, further comprising a first roller on the first end of the second suspension arm, wherein the first roller rolls along the first slot, and a second roller on the second end of the second suspension arm, wherein the second roller rolls along the second slot.

8. The suspension configuration of claim 1, further comprising a first slider on the first end of the second suspension arm, wherein the first slider slides along the first slot, and a second slider on the second end of the second suspension arm, wherein the second slider slides along the second slot.

9. The suspension configuration of claim 1, further comprising a first pin on the first end of the first suspension arm, wherein the first pin permits rotation of the first suspension arm with respect to the lower support frame and prevents translation of the first suspension arm with respect to the lower support frame, and a second pin on the second end of the first suspension arm, wherein the second pin permits rotation of the first suspension arm with respect to the upper support frame and prevents translation of the first suspension arm with respect to the upper support frame.

10. A vehicle comprising:
a chassis;
a wheel supporting the chassis;
a prime mover mounted to the chassis;
a transmission for driving the wheel in response to the operation of the prime mover;
a lower support frame mounted to the vehicle, the lower support frame including a first slot;
an upper support frame spaced a distance vertically above the lower support frame, the upper support frame including a second slot;
a seat cushion positioned on the upper support frame;
at least one biasing member coupled to the lower support frame and coupled to the upper support frame, the at least one biasing member biasing the upper support frame away from the lower support frame;
a first suspension arm having a first end coupled to the lower support frame for rotation with respect to the lower support frame and a second end coupled to the upper support frame for rotation with respect to the upper support frame; and
a second suspension arm having a first end coupled to the first slot in the lower support frame for rotation with respect to the lower support frame and for translation with respect to the lower support frame along the first slot and a second end coupled to the second slot in the upper support frame for rotation with respect to the upper support frame and for translation with respect to the upper support frame along the second slot,
wherein the first suspension arm is coupled to the second suspension arm at a coupling location between the first and second ends of the second suspension arm and between the first and second ends of the first suspension arm, the first suspension arm being rotatable with respect to the second suspension arm about the coupling location.

11. The vehicle of claim 10, wherein the first slot permits substantially horizontal movement of the first end of the second suspension arm and wherein the second slot permits substantially horizontal movement of the second end of the second suspension arm.

12. The vehicle of claim 10, wherein the upper support frame moves a distance of between about two inches and about eight inches with respect to the lower support frame between a fully raised position in which at least one of the first and second ends of the second suspension arm is at an end of one of the respective first and second slots and a fully lowered position in which at least one of the first and second ends is at another end of the respective first and second slots.

13. The vehicle of claim 12, wherein the upper support frame moves a distance of between about three inches and about six inches with respect to the lower support frame in response to the first suspension arm rotating with respect to the second suspension arm about the coupling location.

14. The vehicle of claim 10, wherein the upper support frame moves substantially vertically with respect to the lower support frame in response to the first suspension arm rotating with respect to the second suspension arm about the coupling location.

15. The vehicle of claim 10, further comprising a user actuable control coupled to the seat and operable to alter the stiffness of the at least one biasing member which thereby alters the stiffness of the suspension.

16. The vehicle of claim 10, further comprising a first roller on the first end of the second suspension arm, wherein the first roller rolls along the first slot, and a second roller on the second end of the second suspension arm, wherein the second roller rolls along the second slot.

17. The vehicle of claim 10, further comprising a first slider on the first end of the second suspension arm, wherein the first slider slides along the first slot, and a second slider on the second end of the second suspension arm, wherein the second slider slides along the second slot.

18. The vehicle of claim 10, further comprising a first pin on the first end of the first suspension arm, wherein the first pin permits rotation of the first suspension arm with respect to the lower support frame and prevents translation of the first suspension arm with respect to the lower support frame, and a second pin on the second end of the first suspension arm, wherein the second pin permits rotation of the first suspension arm with respect to the upper support frame and prevents translation of the first suspension arm with respect to the upper support frame.

\* \* \* \* \*